US008623312B2

(12) United States Patent
Yohei et al.

(10) Patent No.: US 8,623,312 B2
(45) Date of Patent: Jan. 7, 2014

(54) PROCESS FOR PRODUCING DISPERSION OF HOLLOW FINE SIO$_2$ PARTICLES, COATING COMPOSITION AND SUBSTRATE WITH ANTIREFLECTION COATING FILM

(75) Inventors: Kawai Yohei, Yokohama (JP); Yoneda Takashige, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 495 days.

(21) Appl. No.: 11/939,880

(22) Filed: Nov. 14, 2007

(65) Prior Publication Data

US 2008/0241474 A1     Oct. 2, 2008

Related U.S. Application Data

(63) Continuation of application No. PCT/JP2006/305284, filed on Mar. 16, 2006.

(30) Foreign Application Priority Data

Jun. 2, 2005  (JP) ................................ 2005-162486

(51) Int. Cl.
 *C01B 33/12* (2006.01)
(52) U.S. Cl.
 USPC ........... 423/336; 423/335; 423/339; 423/338; 106/287.34; 106/281.1; 106/481; 428/403; 428/402
(58) Field of Classification Search
 USPC ................................. 423/335, 339
 See application file for complete search history.

(56) References Cited

U.S. PATENT DOCUMENTS

| 5,024,826 | A | * | 6/1991 | Linton ........................... 423/335 |
| 6,034,210 | A | * | 3/2000 | Tashima et al. ................ 530/203 |
| 7,323,122 | B2 | * | 1/2008 | Muraguchi et al. ......... 252/521.3 |
| 2005/0116205 | A1 | | 6/2005 | Muraguchi et al. |
| 2005/0121654 | A1 | | 6/2005 | Muraguchi et al. |

FOREIGN PATENT DOCUMENTS

| JP | A-6-142491 | 5/1994 |
| JP | A-2000-500113 | 1/2000 |
| JP | 2001-233611 A | 8/2001 |
| JP | 2002-160907 A | 6/2002 |
| JP | 10-2004-0099228 A | 11/2004 |
| JP | 2005-119909 | 5/2005 |
| WO | WO 03/104319 | * 12/2003 ............... C08K 9/02 |

OTHER PUBLICATIONS

U.S. Appl. No. 11/947,848, filed Nov. 30, 2007, Kawai, et al.
L. Dai, et al. "Coaxial ZnO/SiO$_2$ nanocables fabricated by thermal evaporation/oxidation", Applied Physics A, vol. 78, Dec. 19, 2003, pp. 557-559, XP002586912.
U.S. Appl. No. 12/959,021, filed Dec. 2, 2012, Kawai, et al.
U.S. Appl. No. 12/984,063, filed Jan. 4, 2011, Kawai, et al.
U.S. Appl. No. 13/097,121, filed Apr. 29, 2011, Kawai, et al.
U.S. Appl. No. 13/023,850, filed Feb. 9, 2011, Otani, et al.

* cited by examiner

*Primary Examiner* — Patricia L Hailey
*Assistant Examiner* — Smita Patel
(74) *Attorney, Agent, or Firm* — Oblon, Spivak, McClelland, Maier & Neustadt, L.L.P.

(57) ABSTRACT

To provide a process for producing a dispersion of hollow fine SiO$_2$ particles which contains no residual core fine particles, generates no uncontrollable agglomerates, and is easy to filtrate.

A process for producing a dispersion of hollow fine SiO$_2$ particles having hollow fine SiO$_2$ particles dispersed in a dispersion medium, which comprises at least the following steps (a), (b) and (c):

(a) a step of reacting a precursor of SiO$_2$ at a pH higher than 8 in the presence of fine ZnO particles constituting the core in the dispersion medium to form SiO$_2$, thereby to obtain a dispersion of fine particles comprising the fine ZnO particles covered with the formed SiO$_2$;

(b) a step of mixing an acidic cation exchange resin with the dispersion of fine particles obtained in the above step (a) to bring them into contact with each other, to dissolve the fine ZnO particles as the core at a pH within a range of from 2 to 8; and (c) a step of separating the acidic cation exchange resin by solid-liquid separation after the fine ZnO particles are completely dissolved, to obtain the dispersion of hollow fine SiO$_2$ particles.

20 Claims, No Drawings

PROCESS FOR PRODUCING DISPERSION OF HOLLOW FINE SiO₂ PARTICLES, COATING COMPOSITION AND SUBSTRATE WITH ANTIREFLECTION COATING FILM

TECHNICAL FIELD

The present invention relates to a process for producing a dispersion of hollow fine $SiO_2$ particles, a coating composition containing the dispersion, to obtain a coating film having high antireflection properties, and a substrate with an antireflection coating film obtained by applying the coating composition.

BACKGROUND ART

Hollow fine $SiO_2$ particles have an air gap in the interior of the $SiO_2$ shell and have a high porosity, a low refractive index and a low dielectric constant and are thereby useful for prevention of reflection, an optical filter, a heat insulating material, a low dielectric constant material, drug delivery, etc. Particularly, they are known to be useful as an antireflection coating film material by virtue of their low refractive index owing to their hollow shape, and various processes for their production have been studied. Generally, such hollow fine $SiO_2$ particles are obtained by removing only core fine particles of core/shell fine particles wherein the shell is $SiO_2$ so that the $SiO_2$ shell remains and the interior of the particles becomes hollow.

In the conventional method, one technical point is to determine which core fine particles are used and how they are removed by e.g. dissolution.

For example, in a case where an organic polymer is used as the core fine particles, the core fine particles are removed by thermal decomposition (Patent Document 1), and in a case where an inorganic compound is used, it is common to remove the core fine particles by dissolving them with an acid (Patent Documents 2 and 3).

However, the former method has such a restriction that thermal decomposition under high temperature conditions is required, and in a case where the substrate is an organic resin, the organic polymer core fine particles are preliminarily thermally decomposed and then dissolved in a solvent to prepare a coating fluid, such being troublesome.

On the other hand, according to studies by the present inventors, the latter method, which seems to be carried out more easily, was found to have such a problem that the ionic strength in a solution suddenly increases by ions generated by addition of an acid and ions generated from the dissolved core fine particles, thus lowering the stability of the solution, whereby hollow fine $SiO_2$ particles are agglomerated in an uncontrollable state. If the hollow fine $SiO_2$ particles are agglomerated in an uncontrollable state, the agglomerated particle size tends to be too large, thus impairing transparency of the resulting coating film. Accordingly, the concentration of the solution when the inorganic compound core fine particles are dissolved is restricted to a low concentration range, such being disadvantageous in productivity. Further, bothersome ultrafiltration is required to remove generated ions, and in addition, a very long time is required for filtration.

Further, to remove the core fine particles, requirement such as thermal decomposition at high temperature in the case of the former method and addition of a strong acid in the case of the latter method are required, but as described above, it is difficult to control the dissolution step, and the core fine particles will not completely be decomposed or removed by dissolution unless operation conditions are very precisely controlled, and some of the core fine particles remain, whereby no sufficient antireflection properties will be obtained. Further, in a case where the core fine particles contain a $SiO_2$ component, the $SiO_2$ remains, whereby the antireflection properties are insufficient. As described hereinafter, in the present invention, ZnO which is easily soluble is used as the core, and accordingly such remaining of the core material will not occur, whereby high antireflection properties can be obtained.

Patent Document 1: JP-A-6-142491 (Claims 1 to 4)
Patent Document 2: JP-A-2000-500113 (Claims 1 to 17)
Patent Document 3: JP-A-2001-233611 (Claims 1 to 11)

DISCLOSURE OF THE INVENTION

Objects to be Accomplished by the Invention

The object of the present invention is to produce a dispersion of hollow fine $SiO_2$ particles without remaining of core fine particles, and to provide a coating composition containing such a dispersion and a method for obtaining a coating film having high antireflection properties. Further, another object of the present invention is to produce a dispersion by dissolving core fine particles without agglomeration of hollow fine $SiO_2$ particles in an uncontrollable state, and to provide a method for obtaining a coating film having high transparency from a coating composition containing the dispersion. Still another object of the present invention is to provide a process for producing a dispersion of hollow fine $SiO_2$ particles suitably used for a coating composition by an easy method which requires no ultrafiltration requiring a long period of time.

Means to Accomplish the Objects

Namely, the present invention provides the following.
(1) A process for producing a dispersion of hollow fine $SiO_2$ particles having hollow fine $SiO_2$ particles dispersed in a dispersion medium, which comprises at least the following steps (a), (b) and (c):

(a) a step of reacting a precursor of $SiO_2$ at a pH higher than 8 in the presence of fine ZnO particles constituting the core in the dispersion medium to form $SiO_2$, thereby to obtain a dispersion of fine particles comprising the fine ZnO particles covered with the formed $SiO_2$;

(b) a step of mixing an acidic cation exchange resin with the dispersion of fine particles obtained in the above step (a) to bring them into contact with each other, to dissolve the fine ZnO particles as the core at a pH within a range of from 2 to 8; and (c) a step of separating the acidic cation exchange resin by solid-liquid separation after the fine ZnO particles are completely dissolved, to obtain the dispersion of hollow fine $SiO_2$ particles.

(2) The production process according to the above (1), wherein the average primary particle size of the fine ZnO particles is from 5 to 200 nm.

(3) The production process according to the above (1) or (2), wherein the acidic cation exchange resin has —$SO_3H$ groups.

(4) A coating composition containing a dispersion of hollow fine $SiO_2$ particles obtained by the production process as defined in any one of the above (1) to (3).

(5) The coating composition according to the above (4), wherein the hollow fine $SiO_2$ particles are agglomerates, and the average agglomerated particle size in the dispersion is from 60 to 400 nm.

(6) The coating composition according to the above (4) or (5), which has a matrix component mixed with the coating composition in an amount of from 0.1 to 10 times the total amount of solid content of the follow fine $SiO_2$ particles as calculated as solid content.

(7) The coating composition according to the above (6), wherein the matrix component is a precursor of a metal oxide and/or an organic resin.

(8) The coating composition according to the above (7), wherein the metal oxide is one member or a mixture of at least two selected from the group consisting of $Al_2O_3$, $SiO_2$, $SnO_2$, $TiO_2$ and $ZrO_2$.

(9) The coating composition according to the above (7), wherein the organic resin is a ultraviolet-curable organic resin.

(10) A substrate with an antireflection coating film, obtained by applying the coating composition as defined in any one of the above (4) to (9) to a substrate.

(11) The substrate with an antireflection coating film according to the above (10), wherein the substrate is a transparent substrate.

Effects of the Invention

According to the present invention, a dispersion of hollow fine $SiO_2$ particles without remaining of core fine particles is produced, and a method for obtaining a coating film having high antireflection properties is provided. Further, according to the present invention, in production of hollow fine $SiO_2$ particles by dissolving core particles, a dispersion of agglomerated particles with a stable particle size can be obtained without agglomeration in an uncontrollable state, and a method for obtaining a coating film having high transparency from the dispersion is provided. Further, according to the present invention, a process for producing a dispersion of hollow fine $SiO_2$ particles suitably used for a coating composition by a simple method which requires no ultrafiltration requiring a long period of time, is provided.

BEST MODE FOR CARRYING OUT THE INVENTION

Now, the present invention will be described in further detail.

(a) (Formation of Core/Shell Particles)

In the process for producing a dispersion of fine $SiO_2$ particles having hollow $SiO_2$ dispersed in a dispersion medium of the present invention, first, formation of core/shell particles, i.e. step (a) of reacting a precursor of $SiO_2$ constituting the shell of particles at a pH higher than 8 in the presence of fine ZnO particles constituting the core in the dispersion medium to form $SiO_2$, thereby to obtain a dispersion of fine particles comprising the fine ZnO particles covered with the formed $SiO_2$, is carried out.

(Core Fine ZnO Particles)

In the present invention, one of characteristics is use of fine ZnO particles as the core particles. This is because ZnO is easily ionized and is completely dissolved at a pH of at most 8, and is thereby particularly suitable as the core particles.

The fine ZnO particles to be used in the present invention may be one prepared by either a dry method by e.g. a gas phase method or a wet method by e.g. a liquid phase method, and may be either monodispersed particles or agglomerates. The particle shape is not particularly limited, and one member or a mixture of at least two selected from spheres, rods, tubes and sheets may be used.

Preferably, the ZnO fine particles are used in the form of a dispersion having the fine ZnO particles dispersed in a dispersion medium, in view of handling efficiency.

The dispersion medium for the fine ZnO particles is not particularly limited. It may, for example, be preferably water; an alcohol such as methanol, ethanol, n-propanol, isopropanol, n-butanol, isobutanol, sec-butanol, t-butanol, ethylene glycol, polyethylene glycol, propylene glycol, trimethylene glycol, 1,4-butanediol, cyclopentanol, cyclopentanediol or cyclohexanol; a ketone such as acetone, methyl ethyl ketone, diethyl ketone, methyl isobutyl ketone, methyl propyl ketone, isopropyl methyl ketone, isobutyl methyl ketone, cyclopentanone, cyclohexanone or acetophenone; an ether such as glyme, diglyme, isopropyl ether, isobutyl ether, methyl isopropyl ether, anisole, tetrahydrofuran or dioxane; an ester such as methyl acetate, ethyl acetate, ethyl acetoacetate, butyl acetate, methyl propionate, ethyl propionate, methyl butyrate or ethyl butyrate; a glycol ether such as ethylene glycol monomethyl ether or ethylene glycol monoethyl ether; a nitrogen-containing compound such as N,N-dimethylacetamide, N-methylacetamide, N,N-dimethylformamide, N-methylformamide, 2-pyrrolidinone, N-methyl-2-pyrrolidinone or 1,3-dimethyl-2-imidazolidinone; or a sulfur-containing compound such as dimethyl sulfoxide or sulfolane.

Water is not essentially contained in the dispersion medium for ZnO, but considering that the dispersion medium is used as it is for the subsequent step of hydrolysis/polycondensation of the $SiO_2$ precursor, a preferred dispersion medium is water alone or a solvent mixture of water and the above organic solvent. The organic solvent is an organic solvent which is partially soluble at least in water, preferably an organic solvent in which water is partially soluble, most preferably an organic solvent miscible with water.

The average primary particle size of the fine ZnO particles is preferably from 5 to 200 nm with a view to maintaining an optimum dissolution rate of the core in the subsequent core particles dissolution step and an optimum size of the cavity in the obtained hollow fine $SiO_2$ particles. If the particle size is less than 5 nm, the cavity in the hollow particles tends to be small, and when the hollow particles are blended in the coating film, the antireflection properties tend to be insufficient, and if it exceeds 200 nm, the core dissolution rate tends to be insufficient, whereby completely hollow fine $SiO_2$ particles are hardly obtained.

Further, in a case where agglomerates of the hollow fine $SiO_2$ particles are to be obtained, if the core particles are monodispersed particles, agglomerates of the hollow fine $SiO_2$ particles are hardly obtained, such being undesirable, and agglomerates having from 2 to 10 core fine particles agglomerated are preferably used. However, in general, the fine ZnO particles may be either monodispersed particles or agglomerates.

In such a case, the average agglomerated particle size of the core particles influences over the size of the hollow fine $SiO_2$ particles to be obtained, and to obtain an optimum size, it is from 50 to 400 nm, more preferably from 50 to 350 nm. If it is less than 50 nm, the particle size of the hollow fine $SiO_2$ particles to be obtained will be small, whereby an antireflection film having low chroma saturation will hardly be obtained, and if it exceeds 400 nm, the particle size of $SiO_2$ to be obtained tends to be too large, whereby transparency of the coating film having the hollow fine particles blended may be insufficient.

The dispersion of fine ZnO particles is obtained by adding, to a ZnO particulate powder, the above-mentioned dispersion medium such as water, an alcohol, a ketone, an ester, an ether, a glycol ether, a nitrogen-containing compound or a sulfur-containing compound, followed by peptization by a dispersing machine such as a ball mill, a bead mill, a sand mill, a homomixer or a paint shaker.

The solid content concentration of the dispersion of fine ZnO particles is preferably at most 50 mass % and at least 0.1 mass % so as to secure stability of the dispersion, more preferably at most 30 mass % and at least 1 mass %. If it exceeds 50 mass %, stability of the dispersion tends to decrease.

(Decomposition of $SiO_2$ Precursor and pH and Temperature at the Time of Forming the Shell)

To obtain the dispersion of hollow fine $SiO_2$ particles, first, a dispersion of core/shell fine particles wherein the shell is $SiO_2$ is produced. Specifically, a hydrolysis catalyst such as an acid or an alkali is added in the presence of the fine ZnO particles dispersed in the dispersion medium so that the $SiO_2$ precursor is reacted at a pH higher than 8, whereby the $SiO_2$ precursor is hydrolyzed and precipitated around (on the outer surface of) the fine ZnO particles to form the shell. If the pH of the dispersion at the time of mixing the $SiO_2$ precursor is at most 8, ZnO will be dissolved at this stage, and accordingly it is preferably higher than 8.

The pH of the dispersion is more preferably within a range of from 9 to 11. The higher the pH, the higher the reaction rate of hydrolysis/polycondensation of the $SiO_2$ precursor, whereby the $SiO_2$ shell can be formed in a short time. However, if the pH exceeds 11, the hydrolysis rate tends to be too high, whereby formed $SiO_2$ itself agglomerates, whereby homogeneous formation of the shell on the outer surface of the fine ZnO particles tends to be difficult.

Further, in order to increase the ionic strength to easily form the shell from the $SiO_2$ precursor in production of the dispersion of core/shell fine particles, an electrolyte such as sodium chloride, potassium chloride, calcium chloride, magnesium chloride, sodium nitrate, potassium nitrate, lithium nitrate, calcium nitrate, magnesium nitrate, ammonium nitrate, sodium sulfate, potassium sulfate, ammonium sulfate, ammonia, sodium hydroxide, potassium hydroxide or magnesium hydroxide may be added, to adjust the pH by such an electrolyte.

The higher the temperature at the time of forming the $SiO_2$ shell, the higher the reaction rate of hydrolysis/polycondensation of the $SiO_2$ precursor, whereby the $SiO_2$ shell can be formed in a short time, and accordingly the temperature is usually preferably within a range of from 20 to 100° C. If the temperature exceeds 100° C., the formed $SiO_2$ shell may be formed into non-porous, such being undesirable.

The $SiO_2$ precursor may be one member or a mixture of at least two selected from the group consisting of silicic acid, a silicate and an alkoxysilane, or may be a hydrolysate or a polymer thereof.

Specifically, the silicic acid may be silicic acid obtained by e.g. a method of decomposing an alkali metal silicate with an acid, followed by dialysis, a method of peptizing an alkali metal silicate or a method of bringing an alkali metal silicate into contact with an acid-form cation exchange resin.

The silicate may be an alkali metal silicate such as sodium silicate or potassium silicate, a quaternary ammonium silicate such as ammonium silicate or tetraethylammonium silicate, or a silicate of an amine such as ethanolamine.

Further, the alkoxysilane may be ethyl silicate, an alkoxysilane containing a fluorinated functional group such as a perfluoropolyether group and/or a perfluoroalkyl group, or an alkoxysilane containing one or more functional groups selected from a vinyl group and an epoxy group. The alkoxysilane containing a perfluoropolyether group may, for example, be perfluoropolyether triethoxysilane; the alkoxysilane containing a perfluoroalkyl group may, for example, be perfluoroethyl triethoxysilane; the alkoxysilane containing a vinyl group may, for example, be vinyl trimethoxysilane or vinyl triethoxysilane; and the alkoxysilane containing an epoxy group may, for example, be 2-(3,4-epoxycyclohexyl) ethyl trimethoxysilane, 3-glycidoxypropyl trimethoxysilane, 3-glycidoxypropyl methyldiethoxysilane or 3-glycidoxypropyl triethoxysilane.

(Dispersion Medium, Solid Content Concentration, etc.)

In production of the dispersion of core/shell fine particles, the dispersion medium in which the core fine ZnO particles are dispersed and in which the decomposition reaction of the $SiO_2$ precursor is carried out, is basically water and/or an organic solvent such as an alcohol, a ketone, an ester, an ether, a glycol ether, a nitrogen-containing compound or a sulfur-containing compound which has been described in detail as the dispersion medium for ZnO. However, presence of water is essential in step of hydrolysis/polycondensation/shell formation of the $SiO_2$ precursor, and accordingly, it is necessary that water in an amount of preferably from 5 to 100 mass % is contained in the entire solvent. If the water content is less than 5 mass %, the reaction will not sufficiently proceed. It is necessary that water at least in a stoichiometric amount or more is present in the system based on the amount of Si in the $SiO_2$ precursor in the dispersion medium.

Further, in production of the dispersion of core/shell fine particles, the solid content concentration is preferably within a range of at most 30 mass % and at least 0.1 mass %, more preferably within a range of at most 20 mass % and at least 1 mass %. If it exceeds 30 mass %, stability of the dispersion of fine particles tends to decrease, and if it is less than 0.1 mass %, productivity of the hollow $SiO_2$ particles tends to be very low.

(b) (Dissolution of Core Fine ZnO Particles/Use of Acidic Ion Exchange Resin)

Now, step (b) of dissolving the fine ZnO particles in the dispersion of core/shell fine particles to obtain a dispersion of hollow fine $SiO_2$ particles is carried out.

The fine ZnO particles become $Zn^{2+}$ ions at a pH of at most 8 and are dissolved in the dispersion, and in the present invention, one of characteristics is that the pH of the dispersion is adjusted to be within a range of from 2 to 8, preferably from 2 to 6 by using an acidic cation exchange resin. The eluted $Zn^{2+}$ are exchanged with $H^+$ and fixed on a resin as described hereinafter, whereby ZnO is dissolved without suddenly increasing the ionic strength in the solution. Whereas, if the pH is adjusted to be 8 or below with an acid as in a conventional method, the ionic strength in the solution suddenly increases by ions generated by addition of the acid and the eluted $Zn^{2+}$, whereby the hollow fine $SiO_2$ particles are likely to be agglomerated in an uncontrollable state.

(Acidic Cation Exchange Resin)

The acidic cation exchange resin is preferably an acidic cation exchange resin at least in which ZnO is soluble, which is capable of adjusting the pH of the dispersion to be at least 2 and at most 8, preferably at least 2 and at most 6. The acidity of the cation exchange resin is determined by the functional group, and the functional group may be a —$SO_3H$ group in the case of a strongly acidic cation exchange resin and a —COOH group in the case of a weakly acidic cation exchange resin, but in the present invention, it is preferred to use a highly acidic cation exchange resin having higher capability of dissolving the fine ZnO particles. If the pH is less than 2, the handling tends to be difficult, and such a cation exchange resin may be harmful to the human body.

A strongly acidic cation exchange resin is a resin having a composition comprising sulfonic acid groups introduced as exchange groups to a crosslinked polystyrene as mentioned above, and ZnO as the core of the core/shell fine particles is dissolved by the resin as follows.

The strongly acidic cation exchange resin is represented, when its polystyrene structure is represented by R, by R—SO$_3$H.

Since a sulfonic acid group is a strongly acidic group, it dissociates in water as follows to make the pH be less than 7:

$$2R\text{—}SO_3H \rightarrow 2R\text{—}SO_3^- + 2H^+ \quad (1)$$

Zinc oxide is dissolved as zinc ions at a pH of at most 8:

$$ZnO + 2H^+ \rightarrow Zn^{2+} + H_2O \quad (2)$$

From the above (1) and (2), zinc oxide is dissolved and adsorbed as zinc ions in the resin as follows:

$$2R\text{—}SO_3H + ZnO \rightarrow (R\text{—}SO_3)_2Zn + H_2O \quad (3)$$

As mentioned above, by use of a sulfonic acid type highly acidic cation exchange resin, ZnO can be dissolved without increasing the ionic strength in the solution.

(Exchange Capacity, Surface Area, Particle Size, etc. of Resin)

The amount of the acidic cation exchange resin to be added is preferably such that the total exchange capacity is larger than at least the amount of Zn$^{2+}$ generated. Namely, specifically, at least the acidic cation exchange resin in such an amount that all basic ions present in the solution and Zn$^{2+}$ generated by dissolution of the ZnO core can be exchanged, is required. If the amount of Zn$^{2+}$ generated is larger than the total exchange capacity, the fine ZnO particles will not completely be dissolved but remain in the center portion of the hollow particles, whereby the antireflection properties will be insufficient. The amount of the resin is preferably within a range of from 1.1 to 5 times the required amount. The larger the amount of the acidic cation exchange resin, the higher the dissolution rate of the core, such being favorable, but if the resin amount is too large and it is in excess of 5 times, no higher effect can be expected, and stirring may be difficult, such being unfavorable.

With respect to the cation exchange resin, the larger the surface area, the larger the area of contact with ions, whereby the dissolution rate of ZnO as the core tends to be high. Therefore, the cation exchange resin is preferably one having a large surface area such as a porous type or a highly porous type rather than a gel type. The ZnO dissolution rate is high when the intraparticle diffusion rate of the cation exchange resin is high (low degree of crosslinking) and when the particle size is small. Therefore, it is possible to optimally adjusting the rate of dissolution of ZnO by properly selecting such physical properties.

For example, with respect to the particle size, considering that the smaller the particle size of the cation exchange resin, the larger the surface area and the more the area of contact with ions increases, thus increasing the core dissolution rate, specifically, it is preferred to use a cation exchange resin of 10 to 50 mesh.

With respect to the temperature conditions when the ZnO core is dissolved, the dissolution reaction basically proceeds even at room temperature. Further, the temperature is preferably higher, whereby the dissolution reaction and the rate of diffusion of dissolved ions or the like tend to increase, thus increasing the core dissolution rate. However, if the temperature is too high, the properties of the cation exchange resin may be deteriorated, or the rate of volatilization of the dispersion medium to be used is no more negligible, and accordingly, the temperature is usually from 10 to 100° C., preferably from about 20 to about 80° C.

Complete removal of Zn is confirmed by observation by a transmission electron microscope or by measuring the Zn amount in the dispersion of fine particles by fluorescent X-ray.

(c) (Separation of Cation Exchange Resin)

Finally, step (c) of separating the cation exchange resin by solid-liquid separation such as filtration after the fine ZnO particles are completely dissolved, to obtain the dispersion of hollow fine SiO$_2$ particles, is carried out.

In a conventional method of adding an acid to dissolve the core fine particles, ions generated by dissolution of the core must be removed by a method which requires a long time, such as ultrafiltration. However, by the method of using a cation exchange resin as in the present invention, Zn ions generated by dissolution of ZnO as the core are adsorbed on the cation exchange resin, and accordingly only the cation exchange resin is separated from the dispersion of hollow fine SiO$_2$ particles by solid-liquid separation.

The solid-liquid separation may, specifically, be any unit operation used in conventional chemical engineering, so long as only particles of the cation exchange resin can be separated while the hollow fine SiO$_2$ particles as very fine particles are dispersed in the liquid. Particularly in the present invention, since the particle size of the cation exchange resin is overwhelmingly large as compared with the particle size of the fine SiO$_2$ particles, they are very different in the sedimentation rate, whereby they can easily be separated by sedimentation. Further, it is possible to easily separate them using a filter having an appropriate pore size through which only the fine SiO$_2$ particles pass but no cation exchange resin particles pass, utilizing the particle size difference. The simplest means is a method of removing the cation exchange resin using a filter vapor as the filter, whereby the dispersion of hollow fine SiO$_2$ particles is easily obtained.

(Properties of Hollow Fine SiO$_2$ Particles and Dispersion)

In the present invention, hollow fine SiO$_2$ particles are obtained in the form of their dispersion as mentioned above, and the dispersion of fine SiO$_2$ particles may be either a dispersion of monodispersed particles or a dispersion of agglomerates, preferably a dispersion of agglomerated particles. Further, the shape of particles is also not particularly limited, and one member or a mixture of two or more selected from spheres, rods, tubes and sheets may be used.

The average agglomerated particle size of agglomerated particles in the dispersion of hollow fine SiO$_2$ particles is preferably within a range of from 60 to 400 nm. When it is at least 60 nm, antireflection properties of the resulting coating film will be sufficient, and when it is at most 400 nm, transparency of the coating film will be sufficient. Further, the average primary particle size of the hollow fine SiO$_2$ particles is from 5 to 200 nm, more preferably from 10 to 100 nm. If it is less than 5 nm, antireflection properties of the coating film may be insufficient, and if it exceeds 200 nm, transparency of the coating film may be insufficient.

Further, the thickness of the SiO$_2$ shell is preferably within the range of from 1 to 20 nm and from one-fifth to one-third of the average primary particle size of the fine SiO$_2$ particles. If the thickness of the shell is less than 1 nm and less than one-fifth of the average primary particle size, the hollow shape cannot be kept when the fine ZnO particles are dissolved, and if the thickness exceeds 20 nm and exceeds one-third of the average primary particle size, transparency of the coating film containing the hollow fine SiO$_2$ particles tends to be insufficient.

The SiO$_2$ shell preferably has a porous structure penetrating through the shell wall, since in a step of removing ZnO as the core by dissolution, the ionized core should be discharged to the outside of the particles through the $SiO_2$ shell. The size of the pore is preferably within a range of from about 0.2 to about 10 nm which is sufficiently larger than the $Zn^{2+}$ ionic radius of from 0.74 to 0.88 Å. If the pore size is so large as larger than 10 nm, when a coating composition containing such a dispersion of hollow fine $SiO_2$ particles is formed, the binder component in the coating composition may infiltrate through the pores, thus decreasing the antireflection properties.

Such a porous structure is required in the step of removing the core by dissolution, and is not necessarily required in the subsequent operations, and accordingly after the core is dissolved, the dispersion of hollow fine $SiO_2$ particles may be heated at about 100 to about 300° C. in an autoclave to accelerate hydrolysis and polycondensation reaction of the silicon compound to make it non-porous.

As described above, as a solvent of the dispersion of the hollow fine $SiO_2$ particles, the solvent used in the step of hydrolysis/polycondensation of the $SiO_2$ precursor is preferably used as it is. That is, water or an organic solvent such as an alcohol, a ketone, an ester, an ether, a glycol ether, a nitrogen-containing compound or a sulfur-containing compound may be used. Further, if desired, water may be removed by means of e.g. azeotropic distillation from the solvent so that substantially only an organic solvent is contained, or the organic solvent is removed so that only water or an aqueous solvent is contained.

The solid content concentration of the dispersion of hollow fine $SiO_2$ particles is preferably within a range of at most 50 mass % and at least 0.1 mass %, more preferably at most 30 mass % and at least 0.5 mass %, furthermore preferably at most 20 mass % and at least 1 mass %. If it exceeds 50 mass %, stability of the dispersion of fine particles tends to decrease.

(Coating Composition)

The dispersion of hollow fine $SiO_2$ particles having hollow $SiO_2$ dispersed in a dispersion medium obtained as mentioned above can be used as it is or by adding a matrix component or a conventional compounding agent for formation of a coating composition, to form a coating composition.

That is, the dispersion of hollow $SiO_2$ particles can be used as it is or by adding various compounding agents to obtain a coating composition, which is applied to a substrate thereby to obtain a substrate with an antireflection coating film.

The coating composition of the present invention can improve hardness of a coating film by mixing the $SiO_2$ dispersion with a matrix component (binder). The amount of the matrix component to be mixed as calculated as the solid content is preferably within a range of from 0.1 to 10 times the amount of solid content in the dispersion of hollow fine $SiO_2$ particles. If it is less than 0.1 time, the hardness of the coating film may be insufficient, and if it exceeds 10 times, antireflection properties of the substrate with a coating film may be insufficient.

The matrix component is preferably one curable by heat or ultraviolet rays, and it may, for example, be a precursor of a metal oxide and/or an organic resin.

The metal oxide may be one member or a mixture of at least two selected from the group consisting of $Al_2O_3$, $SiO_2$, $SnO_2$, $TiO_2$ and $ZrO_2$, its precursor may, for example, be a metal alkoxide of the metal and/or its hydrolysis/polycondensation product, and the organic resin may be preferably an ultraviolet-curable organic resin. Specifically, it may, for example, be one member or a mixture of at least two selected from the group consisting of an acrylic resin, a urethane acrylate resin, an epoxy acrylate resin, a polyester acrylate, a polyether acrylate, an epoxy resin and a silicone resin.

Further, the metal alkoxide is preferably an alkoxysilane, and it may, for example, be ethyl silicate, or an alkoxysilane containing a fluorinated functional group such as a perfluoropolyether group and/or a perfluoroalkyl group, or an alkoxysilane containing one or more of functional groups selected from a vinyl group and an epoxy group. The alkoxysilane containing a perfluoropolyether group may, for example, be perfluoropolyether triethoxysilane; the alkoxysilane containing a perfluoroalkyl group may be perfluoroethyl triethoxysilane; the alkoxysilane containing a vinyl group may be vinyl trimethoxysilane or vinyl triethoxysilane; the alkoxysilane containing an epoxy group may be 2-(3,4-epoxycyclohexyl) ethyl trimethoxysilane, 3-glycidoxypropyl trimethoxysilane, 3-glycidoxypropyl methyl diethoxysilane or 3-glycidoxypropyl triethoxysilane.

(Surfactant and the Like)

The coating composition of the present invention may contain a surfactant to improve wettability to a substrate, and any of an anionic surfactant, a cationic surfactant and a nonionic surfactant may be used. The surfactant is preferably a nonionic surfactant having a structural unit of —$CH_2CH_2O$—, —$SO_2$—, —NR— (wherein R is a hydrogen atom or an organic group), —$NH_2$, —$SO_3Y$ or —COOY (wherein Y is a hydrogen atom, a sodium atom, a potassium atom or an ammonium ion). Among them, particularly preferred is a nonionic surfactant having a structural unit of —$CH_2CH_2O$—, whereby the storage stability of the coating composition will not be impaired.

The nonionic surfactant may, for example, be an alkyl polyoxyethylene ether, an alkyl polyoxyethylene/polypropylene ether, a fatty acid polyoxyethylene ester, a fatty acid polyoxyethylene sorbitan ester, a fatty acid polyoxyethylene sorbitol ester, an alkylpolyoxyethyleneamine, an alkylpolyoxyethyleneamide or a polyether-modified silicone surfactant.

(Solid Content Concentration and the Like)

As a solvent of the coating composition of the present invention, in addition to water which is the dispersion medium of the dispersion of fine $SiO_2$ particles, an organic solvent such as an alcohol, a ketone, an ester, an ether, a glycol ether, a nitrogen-containing compound or a sulfur-containing compound may be used.

The solid content concentration of the coating composition of the present invention is preferably within a range of from 0.1 to 50 mass %, more preferably from 0.5 to 30 mass %, most preferably from 1 to 20 mass %. If it is less than 0.1 mass %, it tends to be difficult to form a coating film with a sufficient thickness to obtain antireflection properties, and if it exceeds 50 mass %, stability of the coating composition tends to decrease.

In the coating composition of the present invention, various compounding agents for a coating composition comprising an inorganic compound and/or an organic compound may be blended to impart one or more functions selected from hard coating, coloring, electrical conductivity, antistatic properties, polarization, ultraviolet shielding properties, infrared shielding properties, antifouling properties, anti-fogging properties, photocatalytic activity, antibacterial properties, photoluminescence properties, battery properties, control of refractive index, water repellency, oil repellency, removal of fingerprint and lubricity.

Further, to the coating composition of the present invention, depending upon the function required for the coating film, commonly used additives such as an antifoaming agent, a leveling agent, an ultraviolet absorber, a viscosity modifier, an antioxidant and a fungicide may properly be added. Further, to make the coating film have a desired color, various pigments which are commonly used for a coating composition such as titania, zirconia, white lead and red oxide may be blended.

(Formation of Coating Film)

In the present invention, the coating composition containing the dispersion of fine $SiO_2$ particles is applied and dried on a substrate to form an antireflection coating film i.e. a low refractive index coating film.

The thickness of the antireflection coating film of the present invention is preferably within a range of from 10 to 3,000 nm. If it is less than 10 nm, antireflection properties may be insufficient, and if it exceeds 3,000 nm, cracking is likely to occur, interference fringes may form, or scars tend to outstand.

The reflectance of the coating film can be measured by a spectrophotometer and the antireflection coating film of the present invention preferably has, in a visible region at a wavelength of from 380 to 780 nm, a minimum reflectance of at most 2%, particularly preferably has a difference between the maximum and minimum reflectances of at most 1%. If the minimum reflectance exceeds 2%, function as a low refractive index coating film may be insufficient. Further, if the difference between maximum and minimum reflectances exceeds 1%, the chroma saturation tends to be too high.

Further, it is preferred to adjust the thickness of the antireflection coating film to be obtained by the present invention so that the reflectance at a wavelength of 550 nm becomes minimum. The thickness can be adjusted in accordance with the thickness=$\lambda/4n$ (wherein $\lambda$ is the wavelength of light and n is the refractive index of the film).

The transparency of the coating film is preferably evaluated by the haze in accordance with JIS K-7150 standard. The haze of the coating film is preferably at most 1%, particularly preferably at most 0.5%. If the haze exceeds 1%, the transmittance tends to be low, thus leading to poor transparency.

On the surface of the coating film of the present invention, a coating film having a specific function comprising an inorganic compound and/or an organic compound may be further formed to impart one or more functions selected from hard coating, coloring, electrical conductivity, antistatic properties, polarization, ultraviolet shielding properties, infrared shielding properties, antifouling properties, anti-fogging properties, photocatalytic activity, antifungal properties, photoluminescence properties, battery properties, control of refractive index, water repellency, oil repellency, removal of fingerprint and lubricity.

(Substrate)

The substrate to which the coating composition of the present invention is applied may be optional one depending upon the purpose of use and is not particularly limited. For example, an antireflection coating film is to be formed, the substrate may be either transparent or opaque but is preferably a transparent substrate, and it may, for example, be glass or a transparent organic resin substrate. The shape of the substrate may be a plate-shape or a film-shape, and the shape of the substrate is not limited to a flat plate, and the substrate may have a curvature on the entire or a part of the surface.

The organic resin forming the substrate may be preferably one member or a mixture of at least two selected from a polyethylene terephthalate, a polycarbonate, a polymethyl methacrylate (PMMA), triacetyl cellulose and the like.

On such a substrate, a coating film comprising an inorganic compound and/or an organic compound may be preliminarily formed to impart one or more functions selected from hard coating, coloring, electrical conductivity, antistatic properties, polarization, ultraviolet shielding properties, infrared shielding properties, antifouling properties, anti-fogging properties, photocatalytic activity, antifungal properties, photoluminescence properties, battery properties, control of refractive index, and the like. Further, on a coating film containing hollow fine $SiO_2$ particles obtained by applying the coating composition of the present invention, a functional coating film comprising an inorganic compound and/or an organic compound may be formed to impart one or more functions selected from hard coating, coloring, electrical conductivity, antistatic properties, polarization, ultraviolet shielding properties, infrared shielding properties, antifouling properties, anti-fogging properties, photocatalytic activity, antibacterial properties, photoluminescence properties, battery properties, control of refractive index, water repellency, oil repellency, removal of fingerprint, lubricity, and the like.

(Coating Method)

The coating composition of the present invention may be applied by a known method. For example, roller coating, hand coating, brush coating, dipping, spin coating, dip coating, coating by various printing methods, curtain flow, bar coating, die coating, gravure coating, microgravure coating, reverse coating, roll coating, flow coating, spray coating or dip coating may be mentioned.

Further, for the purpose of increasing the mechanical strength of the coating film, heating or irradiation with ultraviolet rays, electron rays or the like may be carried out as the case requires. The heating temperature may be determined considering heat resistance of the substrate but is preferably from 60 to 700° C.

When the coating composition of the present invention is applied, no particular pre-treatment on the organic resin substrate is required, but for the purpose of further increasing adhesion of the coating film, a discharge treatment such as plasma treatment, corona treatment, UV treatment or ozone treatment, a chemical treatment with e.g. water, an acid or an alkali, or a physical treatment using an abrasive may be applied.

EXAMPLES

Now, the present invention will be described in further detail with reference to Examples of the present invention (Examples 1 to 4) and Comparative Examples (Examples 5 to 7). However, the present invention is by no means restricted to such specific Examples.

Example 1

A Case where Core=ZnO, Matrix=$SiO_2$ and Substrate=Glass (1) To a glass reactor having a capacity of 200 ml, 60 g of ethanol, 30 g of a sol having fine ZnO particles water-dispersed (manufactured by Sakai Chemical Industry Co., Ltd., tradename: NANOFINE-50, average primary particle size: 20 nm, average agglomerated particle size: 100 nm, concentration as calculated as solid content: 10 mass %) and 10 g of tetraethoxysilane ($SiO_2$ solid content concentration: 29 mass %) were added, and then an aqueous ammonia solution was added to adjust pH=10, followed by stirring at 20° C. for 6 hours to obtain 100 g of a dispersion of core/shell fine particles (solid content concentration: 6 mass %).

(2) 100 g of a strongly acidic cation exchange resin (manufactured by Mitsubishi Chemical Corporation, tradename: DIAION, total exchange capacity: at least 2.0 meq/ml) was added to the obtained dispersion of core/shell fine particles, followed by stirring for one hour, and after the pH became 4, the strongly acidic cation exchange resin was removed by filtration to obtain 100 g of a dispersion of hollow fine $SiO_2$ particles. The thickness of the shell of the $SiO_2$ hollow particles was 10 nm, and the pore size was 20 nm. Further, the fine $SiO_2$ particles were agglomerated particles, the average agglomerated particle size was 100 nm, and the solid content concentration was 3 mass %.

(3) To a glass reactor having a capacity of 200 ml, 23 g of the obtained dispersion of hollow fine $SiO_2$ particles, 65 g of ethanol, 10 g of a silicic acid oligomer solution (solid content concentration: 3 mass %, ethanol solvent) obtained by hydrolyzing tetraethoxysilane with nitric acid, as a matrix component, and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

(4) The obtained hollow $SiO_2$ agglomerated particles and coating composition were subjected to evaluation tests as follows.

(A) Hollow $SiO_2$ Agglomerated Particles

The following evaluations were conducted with respect to the hollow fine $SiO_2$ particles. The evaluation results are shown in Table 1.

(i) The average primary particle size, the shape and the core remaining of the hollow $SiO_2$ agglomerated particles were observed by a transmission electron microscope (manufactured by Hitachi, Ltd., model: H-9000).

(ii) The average agglomerated particle size was measured by a dynamic light scattering particle size analyzer (manufactured by NIKKISO, CO., LTD., model: Microtrac UPA).

(B) The Coating Composition was Evaluated with Respect to a Coating Film Obtained by Applying it.

The coating composition was applied to a substrate wiped with ethanol (100 mm×100 mm, thickness: 3.5 mm, the refractive index of the substrate: 1.52 in the case of a glass substrate or 1.58 in the case of a PMMA substrate), followed by spin coating at a number of revolutions of 200 rpm for 60 seconds to uniformalize the composition, and the composition was dried at 200° C. for 30 minutes to form a coating film with a thickness of 100 nm as a measurement sample. The sample having a coating film formed thereon was subjected to the following evaluations. The results are shown in Table 2.

(i) To evaluate the reflectance, the reflectance of the obtained coating film was measured by a spectrophotometer (manufactured by Hitachi, Ltd., model: U-4100).

(ii) To evaluate the outer appearance, the coating unevenness of the obtained coating film was visually evaluated on the basis of the evaluation standards ○: favorable outer appearance without coating unevenness and X: impractical with coating unevenness.

(iii) To evaluate transparency, evaluation was conducted by the haze. The haze was measured in accordance with JIS K-7105. The haze of the coating film on the substrate was measured by a haze computer (manufactured by SUGA TEST INSTRUMENTS Co., Ltd., model: HGM-3DP).

(iv) To evaluate abrasion resistance, the surface of the coating film of the sample was abraded by a Taber abrader for 100 reciprocations, and the coating film peeling state was visually observed on the basis of evaluation standards ○: no coating film peeled at all, Δ: a part of the coating film peeled, but a half or larger area remained, and X: more than half peeled.

Example 2

Core=ZnO, Matrix=$TiO_2$, Substrate=Glass (1) 100 g of a dispersion of hollow fine $SiO_2$ particles (average agglomerated particle size: 100 nm, solid content concentration: 3 mass %) was obtained in the same manner as in Example 1. Further, the thickness of the shell of the hollow $SiO_2$ primary particles was 10 nm and the pore size was 20 nm. The measurement results of the dispersion of hollow fine $SiO_2$ particles are shown in Table 1.

(2) To a glass reactor having a capacity of 200 ml, 23 g of the obtained dispersion of hollow fine $SiO_2$ particles, 65 g of ethanol, 10 g of a titanic acid oligomer solution (solid content concentration of 3 mass %, ethanol solvent) obtained by hydrolyzing titanium isopropoxide with nitric acid and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

Using the coating composition, in the same manner as in Example 1, a coating film was formed on a substrate and evaluated. The results are shown in Table 2.

Example 3

Core=ZnO, Matrix=PMMA, Substrate=Glass (1) 100 g of a dispersion of hollow fine $SiO_2$ particles (average agglomerated particle size: 100 nm, solid content concentration: 3 mass %) was obtained in the same manner as in Example 1. Further, the thickness of the shell of the hollow $SiO_2$ primary particles was 10 nm and the pore size was 20 nm. The measurement results of the dispersion of hollow fine $SiO_2$ particles are shown in Table 1.

(2) To a glass reactor having a capacity of 200 ml, 65 g of ethanol, 23 g of the obtained dispersion of hollow fine $SiO_2$ particles, 10 g of a methyl methacrylate monomer solution (solid content concentration: 3 mass %, photo initiator: 0.1 mass %, butyl acetate and isopropyl alcohol solvent) as a matrix resin, and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

Using the coating composition, in the same manner as in Example 1, a coating film was formed on a substrate, and the coating film was cured by irradiation with ultraviolet rays for 10 minutes and evaluated. The results are shown in Table 2.

Example 4

Core=ZnO, Matrix=Polymethyl Acrylate, Substrate=PMMA (1) 100 g of a dispersion of hollow fine $SiO_2$ particles (average agglomerated particle size: 100 nm, solid content concentration: 3 mass %) was obtained in the same manner as in Example 1. Further, the thickness of the shell of the hollow $SiO_2$ primary particles was 10 nm and the pore size was 20 nm. The measurement results of the dispersion of hollow fine $SiO_2$ particles are shown in Table 1.

(2) To a glass reactor having a capacity of 200 ml, 23 g of the obtained dispersion of hollow fine $SiO_2$ particles, 65 g of ethanol, 10 g of a methyl acrylate monomer solution (solid content concentration: 3 mass %, photo initiator: 0.1 mass %, butyl acetate and isopropyl alcohol solvent) and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

Using the coating composition, a coating film was formed on a substrate in the same manner as in Example 1 except that the glass substrate was changed to PMMA, and the coating film was cured by irradiation with ultraviolet rays for 10 minutes and evaluated. The results are shown in Table 2.

Example 5

Core=ZnO, Acid Dissolution, Matrix=$SiO_2$, Substrate=Glass (1) 100 g of a dispersion of core/shell fine particles (solid content concentration: 6 mass %) was obtained in the same manner as in Example 1.

(2) To the obtained dispersion of core/shell fine particles, hydrochloric acid was added instead of the acidic ion exchange resin to adjust the pH to 2, and ions generated by dissolution of the fine ZnO particles were removed by ultrafiltration to obtain 100 g of a dispersion of hollow fine $SiO_2$ particles (average agglomerated particle size: 500 nm, solid content concentration: 3 mass %). The thickness of the shell of the hollow $SiO_2$ primary particles was 10 nm, and the pore size was 20 nm. Measurement results of the dispersion of hollow fine $SiO_2$ particles are shown in Table 1.

(3) To a glass reactor having a capacity of 200 ml, 65 g of ethanol, 23 g of the obtained dispersion of hollow fine $SiO_2$ particles, 10 g of a $SiO_2$ oligomer solution (solid content concentration: 3 mass %, ethanol solvent) and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

Using the coating composition, in the same manner as in Example 1, a coating film was formed on a substrate and evaluated. The results are shown in Table 2. The coating film particularly had a very high haze. This is considered to be because when the fine ZnO particles were dissolved by an acid, the particles agglomerated, and the average agglomerated particle size of the obtained hollow $SiO_2$ agglomerated particles became large, whereby the coating film had insufficient transparency.

Example 6

Core=Calcium Carbonate, Matrix=$SiO_2$, Substrate=Glass (1) 100 g of a dispersion of core/shell fine particles (solid content concentration: 6 mass %) was obtained in the same manner as in Example 1 except that calcium carbonate was used in place of ZnO.

(2) 100 g of a strongly acidic cation exchange resin (manufactured by Mitsubishi Chemical Company, tradename: DIAION, total exchange capacity: at least 2.0 (meq/ml)) was added to the obtained dispersion of core/shell fine particles, followed by stirring for one hour. During stirring, intense bubbling occurred to generate $CO_2$. After the pH became 4, the strongly acidic cation exchange resin was removed by filtration to obtain 100 g of a dispersion of hollow fine $SiO_2$ particles (average agglomerated particle size: 100 nm, solid content concentration: 3 mass %). As observed by TEM, most of the shell of the hollow $SiO_2$ was confirmed to be destroyed. This is considered to be due to $CO_2$ generated when the core was dissolved. The measurement results of the dispersion of hollow $SiO_2$ particles are shown in Table 1.

(3) To a glass reactor having a capacity of 200 ml, 23 g of the obtained dispersion of hollow fine $SiO_2$ particles, 65 g of ethanol, 10 g of a $SiO_2$ oligomer solution (solid content concentration: 3 mass %, ethanol solvent) and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

Using the coating composition, in the same manner as in Example 1, a coating film was formed on a substrate and evaluated. The results are shown in Table 2. The coating film particularly had a very low minimum reflectance. This is considered to be because when fine $CaCO_3$ particles were dissolved by addition of the strongly acidic cation exchange resin, the shell of the hollow $SiO_2$ particles was destroyed as mentioned above, whereby no sufficient antireflection properties were obtained.

Example 7

Core=Sodium Aluminate and Sodium Silicate, Matrix=$SiO_2$, Substrate=Glass, Firing at 200° C.

(1) To a glass reactor having a capacity of 200 ml, 1 g of a dispersion of fine $SiO_2$ particles (manufactured by Catalysts & Chemicals Industries Co., Ltd., tradename: SI-550, average particle size: 5 nm, $SiO_2$ concentration: 20 mass %, water solvent) and 19 g of water were added, mixed and heated at 80° C.

To the dispersion of fine particles (pH=10.5), 90 g is of an aqueous sodium silicate solution ($SiO_2$ solid content concentration: 1.2 mass %) and 90 g of an aqueous sodium aluminate solution ($Al_2O_3$ solid content concentration: 0.8 mass %) were simultaneously added to precipitate $SiO_2$ and $Al_2O_3$. The pH of the dispersion of fine particles after completion of the addition was 12.5. The reaction liquid was cooled to room temperature, and 200 g of a dispersion of $SiO_2/Al_2O_3$ core fine particles (solid content concentration: 20 mass %) was obtained by an ultrafilter membrane.

(2) To a glass reactor having a capacity of 1,000 ml, 5 g of the dispersion of core fine particles and 17 g of pure water were added and heated at 98° C., and 30 g of a silicic acid solution ($SiO_2$ concentration: 3.5 mass %) obtained by dealkalization of an aqueous sodium silicate solution with a strongly acidic cation exchange resin (manufactured by Mitsubishi Chemical Corporation, tradename: DIAION) was added to precipitate silica, the reaction liquid was cooled to room temperature, and 500 g of a dispersion of fine particles comprising $SiO_2/Al_2O_3$ or covered with $SiO_2$ (solid content concentration: 13 mass %) was obtained by an ultrafilter membrane.

(3) Then, 2,167 g of pure water and 3,000 g of a strongly acidic cation exchange resin (manufactured by Mitsubishi Chemical Corporation, tradename: DIAION, total exchange capacity: at least 2.0 (meq/ml)) were added to remove the $SiO_2/Al_2O_3$ core by dissolution. After stirring for one hour to adjust the pH to 4, the strongly acidic cation exchange resin was removed by filtration to obtain 2,667 g of a dispersion of hollow fine $SiO_2$ particles (average agglomerated particle size: 40 nm, solid content concentration: 3 mass %). The thickness of the shell of the hollow $SiO_2$ particles was 5 nm, and the pore size was 30 nm.

(4) To a glass reactor having a capacity of 200 ml, 65 g of water, 23 g of the obtained dispersion of hollow fine $SiO_2$ particles, 10 g of a $SiO_2$ oligomer solution (solid content concentration: 3 mass %, ethanol solvent) and 2 g of a surfactant solution (manufactured by Nippon Unicar Company Limited, tradename: L-77, solid content concentration: 1 mass %, ethanol solvent) were added, followed by stirring for 10 minutes to obtain an antireflection coating composition.

Using the coating composition, in the same manner as in Example 1, a coating film was formed on a substrate and evaluated. The results are shown in Table 2. The coating film particularly had a high minimum reflectance. This is considered to be because the core fine particles were not completely dissolved but remained, as observed by a transmission microscope, whereby no sufficient antireflection properties were obtained.

TABLE 1

|  | Average primary particle size (nm) | Average agglomerated particle size (nm) | Shape | Core remaining |
|---|---|---|---|---|
| Ex. 1 | 40 | 100 | Hollow | Nil |
| Ex. 2 | 40 | 100 | Hollow | Nil |
| Ex. 3 | 40 | 100 | Hollow | Nil |
| Ex. 4 | 40 | 100 | Hollow | Nil |
| Ex. 5 | 40 | 500 | Hollow | Nil |
| Ex. 6 | 80 | 200 | Irregular | Nil |
| Ex. 7 | 40 | 40 | Hollow | Remained |

TABLE 2

|  | Outer appearance | Minimum reflectance (%) | Haze (%) | Abrasion resistance |
|---|---|---|---|---|
| Ex. 1 | ○ | 0.3 | 0.1 | ○ |
| Ex. 2 | ○ | 0.7 | 0.1 | ○ |
| Ex. 3 | ○ | 0.5 | 0.1 | ○ |
| Ex. 4 | ○ | 0.3 | 0.1 | ○ |
| Ex. 5 | ○ | 0.5 | 1.0 | ○ |
| Ex. 6 | ○ | 3.0 | 0.1 | ○ |
| Ex. 7 | ○ | 1.0 | 0.3 | ○ |

INDUSTRIAL APPLICABILITY (1) According to the present invention, a process for producing a dispersion of hollow fine $SiO_2$ particles suitably used for a coating composition by a simple process which requires no ultrafiltration requiring a long period of time, is provided. Further, according to the present invention, a process for producing a dispersion of hollow fine $SiO_2$ particles without remaining of core fine particles is provided, and a coating composition capable of forming a coating film having high antireflection properties is obtained from the dispersion. Further, according to the present invention, a process for producing a dispersion of hollow fine $SiO_2$ particles by dissolving core fine particles without agglomeration of hollow fine $SiO_2$ particles in an uncontrollable state is provided, and a coating composition capable of providing a coating film having high transparency is obtained from the dispersion.

(2) By applying the coating composition of the present invention comprising a dispersion of hollow fine $SiO_2$ particles obtainable by the process of the present invention to a substrate preferably a transparent substrate, a substrate with an antireflection coating film having high antireflection effects and having high transparency is provided.

(3) The coating composition containing hollow fine $SiO_2$ particles and the substrate with a coating film obtainable by the process of the present invention are applicable to various industrial fields such as automobile glass, building glass, display glass, touch panel glass, optical lenses, solar cell covers, optical filters, antireflection films, polarizing films, heat insulating fillers, low refractive index fillers, low dielectric constant fillers and drug delivery carriers, and they are very highly industrially applicable.

The entire disclosure of Japanese Patent Application No. 2005-162486 filed on Jun. 2, 2005 including specification, claims and summary is incorporated herein by reference in its entirety.

What is claimed is:

1. A process for producing a dispersion of hollow fine $SiO_2$ particles in a dispersion medium, comprising:
    reacting a precursor of $SiO_2$ at a pH higher than 8 in the presence of fine ZnO particles in a dispersion medium such that a dispersion of fine particles comprising the fine ZnO particles covered with $SiO_2$ is obtained;
    dissolving the fine ZnO particles with an acidic cation exchange resin by adding the acidic cation exchange resin to the dispersion of fine particles in an amount which makes a total exchange capacity of the acidic cation exchange resin within a range of from 1.1 to 5 times an amount of zinc ions generated in the dispersion of fine particles, adjusts the pH to within a range of from 2 to 8, and adsorbs the zinc ions; and
    separating the acidic cation exchange resin by solid-liquid separation after the fine ZnO particles are dissolved such that the dispersion of hollow fine $SiO_2$ particles is obtained without separation of the zinc ions by ultrafiltration.

2. The process for producing a dispersion of hollow fine $SiO_2$ particles according to claim 1, wherein the acidic cation exchange resin has —$SO_3H$ groups.

3. The process for producing a dispersion of hollow fine $SiO_2$ particles according to claim 1, wherein the pH at which the fine ZnO particles are dissolved to zinc ions is from 2 to 6.

4. The process for producing a dispersion of hollow fine $SiO_2$ particles according to claim 1, wherein the acidic cation exchange resin is a porous type.

5. The process for producing a dispersion of hollow fine $SiO_2$ particles according to claim 1, wherein a mesh size of the acidic cation exchange resin is from 10 to 50.

6. The process for producing a dispersion of hollow fine $SiO_2$ particles according to claim 1, wherein the fine ZnO particles are dissolved at a temperature of from 10 to 100° C.

7. The process for producing a dispersion of hollow fine $SiO_2$ particles according to claim 1, wherein the thickness of the shell of the hollow fine $SiO_2$ particles is within a range of from 1 to 20 nm and is from one-fifth to one-third of the average primary particle size of the fine $SiO_2$ particles.

8. The process for producing a dispersion of hollow fine $SiO_2$ particles according to claim 1, wherein the average primary particle size of the fine ZnO particles is from 5 to 200 nm and the average primary particle size of the hollow fine $SiO_2$ particles is from 5 to 200 nm.

9. A process for producing a dispersion of hollow fine $SiO_2$ particles in a dispersion medium, comprising:
    reacting a precursor of $SiO_2$ at a pH higher than 8 in the presence of fine ZnO particles in a dispersion medium such that a dispersion of fine particles comprising the fine ZnO particles covered with $SiO_2$ is obtained;
    dissolving the fine ZnO particles with an acidic cation exchange resin by adding the acidic cation exchange resin to the dispersion of fine particles in an amount which adjusts the pH to within a range of from 2 to 8, adsorbs the zinc ions generated in the dispersion, and keeps an average agglomerated particle size of agglomerated particles in the dispersion of the hollow fine $SiO_2$ particles to within a range of from 60 to 400 nm; and separating the acidic cation exchange resin by solid-liquid separation after the fine ZnO particles are dissolved such that the dispersion of hollow fine $SiO_2$ particles is obtained without separation of the zinc ions by ultrafiltration.

10. The process for producing a dispersion of hollow fine $SiO_2$ particles according to claim 9, wherein the acidic cation exchange resin has —$SO_3H$ groups.

11. The process for producing a dispersion of hollow fine $SiO_2$ particles according to claim 9, wherein the precursor of $SiO_2$ is an alkoxysilane or a hydrolysate of the alkoxysilane, and wherein the dispersion medium is a solvent mixture of water and organic solvent, and the water is present in the solvent mixture in an amount of at least 5 mass %.

12. The process for producing a dispersion of hollow fine $SiO_2$ particles according to claim 9, wherein the pH at which the fine ZnO particles are dissolved to zinc ions is from 2 to 6.

13. The process for producing a dispersion of hollow fine $SiO_2$ particles according to claim 9, wherein the acidic cation exchange resin is a porous type.

14. The process for producing a dispersion of hollow fine $SiO_2$ particles according to claim 9, wherein a mesh size of the acidic cation exchange resin is from 10 to 50.

15. The process for producing a dispersion of hollow fine $SiO_2$ particles according to claim 9, wherein the fine ZnO particles are dissolved at a temperature of from 10 to 100° C.

16. The process for producing a dispersion of hollow fine $SiO_2$ particles according to claim 9, wherein the thickness of the shell of the hollow fine $SiO_2$ particles is within a range of from 1 to 20 nm and is from one-fifth to one-third of the average primary particle size of the fine $SiO_2$ particles.

17. The process for producing a dispersion of hollow fine $SiO_2$ particles according to claim 9, wherein the average primary particle size of the fine ZnO particles is from 5 to 200 nm and the average primary particle size of the hollow fine $SiO_2$ particles is from 5 to 200 nm.

18. A process for producing a dispersion of hollow fine $SiO_2$ particles in a dispersion medium, comprising:

reacting a precursor of $SiO_2$ at a pH higher than 8 in the presence of fine ZnO particles in a dispersion medium such that a dispersion of fine particles comprising the fine ZnO particles covered with $SiO_2$ is obtained;

adjusting the pH of the dispersion to within a range of from 2 to 8 by adding an acidic cation exchange resin to the dispersion of fine particles in an amount which dissolves the fine ZnO particles without addition of an acid and adsorbs zinc ions generated in the dispersion of fine particles; and separating the acidic cation exchange resin by solid-liquid separation after the fine ZnO particles are dissolved such that the dispersion of hollow fine $SiO_2$ particles is obtained without separation of the zinc ions by ultrafiltration.

19. The process for producing a dispersion of hollow fine $SiO_2$ particles according to claim 18, wherein the acidic cation exchange resin has —$SO_3H$ groups.

20. The process for producing a dispersion of hollow fine $SiO_2$ particles according to claim 18, wherein the acidic cation exchange resin is a porous type.

* * * * *